(12) United States Patent
Shim et al.

(10) Patent No.: US 12,449,619 B2
(45) Date of Patent: Oct. 21, 2025

(54) VARIABLE LIGHTING APPARATUS WITH DRIVE UNIT TO CHANGE LIGHT OUTPUT TO A PLURALITY OF OPTICAL FIBERS

(71) Applicants: HYUNDAI MOTOR COMPANY, Seoul (KR); KIA CORPORATION, Seoul (KR); SL CORPORATION, Daegu (KR)

(72) Inventors: Joon Bo Shim, Hanam-si (KR); Ji Yeon Kim, Gyeongsan-si (KR)

(73) Assignees: HYUNDAI MOTOR COMPANY, Seoul (KR); KIA CORPORATION, Seoul (KR); SL CORPORATION, Daegu (KR)

( * ) Notice: Subject to any disclaimer, the term of this patent is extended or adjusted under 35 U.S.C. 154(b) by 19 days.

(21) Appl. No.: 18/517,632

(22) Filed: Nov. 22, 2023

(65) Prior Publication Data

US 2024/0418950 A1    Dec. 19, 2024

(30) Foreign Application Priority Data

Jun. 19, 2023 (KR) .......................... 10-2023-0078462

(51) Int. Cl.
*G02B 6/42* (2006.01)
*F21V 8/00* (2006.01)
(Continued)

(52) U.S. Cl.
CPC .......... *G02B 6/4298* (2013.01); *F21V 14/006* (2013.01); *F21V 14/08* (2013.01);
(Continued)

(58) Field of Classification Search
CPC ...... F21V 14/006; F21V 14/06; F21V 14/065; F21V 14/08; F21V 14/085;
(Continued)

(56) References Cited

U.S. PATENT DOCUMENTS

| | | | | |
|---|---|---|---|---|
| 5,226,709 A | * | 7/1993 | Labranche | F21S 4/10 362/556 |
| 5,558,421 A | * | 9/1996 | Guastella | F21S 10/005 362/277 |

(Continued)

FOREIGN PATENT DOCUMENTS

| | | | | |
|---|---|---|---|---|
| DE | 102007022730 A1 | * | 9/2008 | ............. B60Q 3/005 |
| KR | 19980015487 A | | 5/1998 | |

OTHER PUBLICATIONS

Machine translation of DE-102007022730-A1, retrieved from worldwide.espacenet.com on Feb. 4, 2025 (Year: 2025).*

*Primary Examiner* — Abdulmajeed Aziz
*Assistant Examiner* — Steven Y Horikoshi
(74) *Attorney, Agent, or Firm* — Lempia Summerfield Katz LLC (57) ABSTRACT

A variable lighting apparatus allows the light to selectively enter the plurality of optical fibers by changing the position of the light output member having a circular plate shape in the state in which the number of light sources is minimized, such that the optical fibers simultaneously or individually emit light, and thus the patterns in which the light is to be outputted are diversified. In addition, the variable lighting apparatus may minimize the number of required light sources and implement various lighting images only by using the light output member, thereby reducing the manufacturing costs and simplifying the structure.

13 Claims, 12 Drawing Sheets

(51) Int. Cl.
  *F21V 14/00*     (2018.01)
  *F21V 14/08*     (2006.01)
  *B60Q 3/62*      (2017.01)
  *F21S 41/24*     (2018.01)
  *F21S 43/247*    (2018.01)

(52) U.S. Cl.
  CPC .............. *G02B 6/0008* (2013.01); *B60Q 3/62* (2017.02); *F21S 41/24* (2018.01); *F21S 43/247* (2018.01); *F21V 2200/13* (2015.01)

(58) Field of Classification Search
  CPC .............. F21V 2200/10; F21V 2200/13; F21S 10/005; F21S 10/007; F21S 43/235; F21S 43/237; F21S 43/247; F21S 43/251; F21S 41/24; F21S 41/60; F21S 41/63; F21S 41/635; F21S 41/683; F21S 41/686; F21S 41/692; G02B 6/0008; B60Q 3/62–66
  See application file for complete search history.

(56)     References Cited

U.S. PATENT DOCUMENTS

| | | | |
|---|---|---|---|
| 6,008,725 A | 12/1999 | Choi | |
| 2007/0297176 A1* | 12/2007 | Wang | G02B 5/005 |
| | | | 362/282 |
| 2016/0146415 A1* | 5/2016 | Suzuki | F21S 41/192 |
| | | | 362/511 |
| 2020/0026173 A1* | 1/2020 | Chen | G03B 33/08 |
| 2022/0390817 A1* | 12/2022 | Hu | G02B 19/0061 |

\* cited by examiner

VARIABLE LIGHTING APPARATUS WITH DRIVE UNIT TO CHANGE LIGHT OUTPUT TO A PLURALITY OF OPTICAL FIBERS

CROSS-REFERENCE TO RELATED APPLICATION

The present application claims priority to Korean Patent Application No. 10-2023-0078462, filed on Jun. 19, 2023, the entire contents of which are incorporated herein by reference.

BACKGROUND

Field

The present disclosure relates to a variable lighting apparatus that changes a lighting image by diversifying patterns in which light is to be outputted.

Description of the Related Art

A lighting apparatus using a light source is applied to a mobility vehicle. The lighting apparatus is used suitably for characteristics thereof in accordance with a position and depending on the use thereof.

Examples of the lighting apparatus include interior lighting devices disposed in a vehicle interior, headlamps disposed outside the vehicle interior, fog lamps, backup lamps, side lamps, license plate lamps, tail lamps, brake lamps, turn signal lamps, emergency lamps, and the like.

In particular, because a lighting design made by the lighting apparatus contributes to high-grade quality of a product, the lighting design and the lighting effect of the vehicle are considered important.

In general, the lighting apparatus requires a plurality of light sources to implement various lighting images, which increases manufacturing costs.

Therefore, a digital micro-mirror device (DMD) has been applied to minimize the number of light sources. However, a complicated control method is required to control the DMD.

The statements in this section merely provide background information related to the present disclosure and may not constitute prior art.

SUMMARY

The present disclosure provides a variable lighting apparatus capable of reducing manufacturing costs by simplifying a structure that changes a lighting image and diversifies patterns in which light is to be outputted.

In an embodiment of the present disclosure, a variable lighting apparatus includes: a light source module configured to emit light; a light transfer unit including a plurality of optical fibers each having one end disposed to receive the light emitted from the light source module; and a light output member positioned between one end of each of the optical fibers and the light source module and divided into a plurality of regions. In particular, at least one of a light transmission portion, which transmits light, or a light adjustment portion, which blocks and converts a movement of light, is provided in each of the regions. In another form, a plurality of light transmission portions and a plurality of light adjustment portions are provided in at least one region of the plurality of regions. The variable lighting apparatus includes a drive unit connected to the light output member and configured to selectively change a position of the light output member to allow any one of the regions of the light output member to be matched between the light source module and the optical fiber.

The light source module may include: a light source configured to generate light; and a lens part configured to concentrate the light, which is generated by the light source, on one end of the optical fiber.

The light output member may be formed in a circular plate shape and configured to be rotatable, and the plurality of regions may be defined along a rim of the light output member.

The drive unit may include a rotary shaft part configured to rotate in accordance with whether the drive unit operates, and the rotary shaft part may be connected to a rotation center or a peripheral surface of the light output member.

The light transmission portion and the light adjustment portion may extend along a rotation radius of the light output member, and the light transmission portions and the light adjustment portions may be disposed in different patterns in a radial direction of the light output member for each of the regions of the light output member.

The light output member may include: a transmission region including the light transmission portion; a plurality of pattern regions in which the light transmission portions and the light adjustment differently combined to implement different patterns; and a blocking region including the light adjustment portion.

In the plurality of pattern regions, the number of light transmission portions and the number of light adjustment portions may be different or the positions of the light transmission portions and the positions of the light adjustment portions may be different, such that the lighting images made by the emitted light may be differently implemented for each of the pattern regions.

Ends of the plurality of optical fibers may be densely collected by a multi-ferrule, and a width of the densely collected optical fibers may be larger than a width of the light adjustment portion in each of the regions of the light output member.

A single ferrule may be provided at the other end of each of the optical fibers, such that the optical fibers are fixed to another component.

Some of the light transmission portions or the light adjustment portions in the pattern region may be connected to the light transmission portion or the light adjustment portion in another pattern region.

The light adjustment portion may have a plurality of optic portions to scatter the light emitted from the light source module.

The light adjustment portion may be coated with black paint so as not to transmit the light emitted from the light source module.

The plurality of light adjustment portions may be formed to have different colors.

The variable lighting apparatus structured as described above allows the light to selectively enter the plurality of optical fibers by changing the position of the light output member having a circular plate shape in the state in which the number sources is minimized, such that the optical fibers of light simultaneously or individually emit light, and thus the patterns in which the light is to be outputted are diversified. In addition, the variable lighting apparatus may minimize the number of required light sources and implement various lighting images only by using the light output member, thereby reducing the manufacturing costs and simplifying the structure.

DETAILED DESCRIPTION OF THE PRESENT DISCLOSURE

Hereinafter, embodiments disclosed in the present specification are described in detail with reference to the accompanying drawings. The same or similar constituent elements are assigned with the same reference numerals regardless of reference numerals, and the repetitive description thereof has been omitted.

The suffixes "module", "unit", "part", and "portion" used to describe constituent elements in the following description are used together or interchangeably in order to facilitate the description, but suffixes do the themselves not have distinguishable meanings or functions.

In the description of the embodiments disclosed in the present specification, the specific descriptions of publicly known related technologies have been omitted when it is determined that the specific descriptions may obscure the subject matter of the embodiments disclosed in the present specification. In addition, it should be interpreted that the accompanying drawings are provided only to allow those having ordinary skill in the art to easily understand the embodiments disclosed in the present specification, and the technical spirit disclosed in the present specification is not limited by the accompanying drawings, and includes all alterations, equivalents, and alternatives that are included in the spirit and the technical scope of the present disclosure.

The terms including ordinal numbers such as "first," "second," and the like may be used to describe various constituent elements, but the constituent elements are not limited by the terms. These terms are used only to distinguish one constituent element from another constituent element.

When one constituent element is described as being "coupled" or "connected" to another constituent element, it should be understood that one constituent element can be coupled or connected directly to another constituent element, and an intervening constituent element can also be present between the constituent elements. When one constituent element is described as being "coupled directly to" or "connected directly to" another constituent element, it should be understood that no intervening constituent element is present between the constituent elements.

Singular expressions include plural expressions unless clearly described as different meanings in the context. When a component, device, element, or the like of the present disclosure is described as having a purpose or performing an operation, function, or the like, the component, device, or element should be considered herein as being "configured to" meet that purpose or to perform that operation or function.

In the present specification, it should be understood the terms "comprises," "comprising," "includes," "including," "containing," "has," "having" or other variations thereof are inclusive and therefore specify the presence of stated features, integers, steps, operations, elements, components, or combinations thereof, but do not preclude the presence or addition of one or more other features, integers, steps, operations, elements, components, or combinations thereof.

In addition, the term "control unit" or "unit" included in the name of "motor control unit (MCU)" or "hybrid control unit (HCU)" is merely a term widely used to name a control device (controller or control unit) for controlling a particular vehicle function but does not mean a generic function unit.

Hereinafter, a variable lighting apparatus according to an embodiment of the present disclosure is described with reference to the accompanying drawings.

Figure 1:
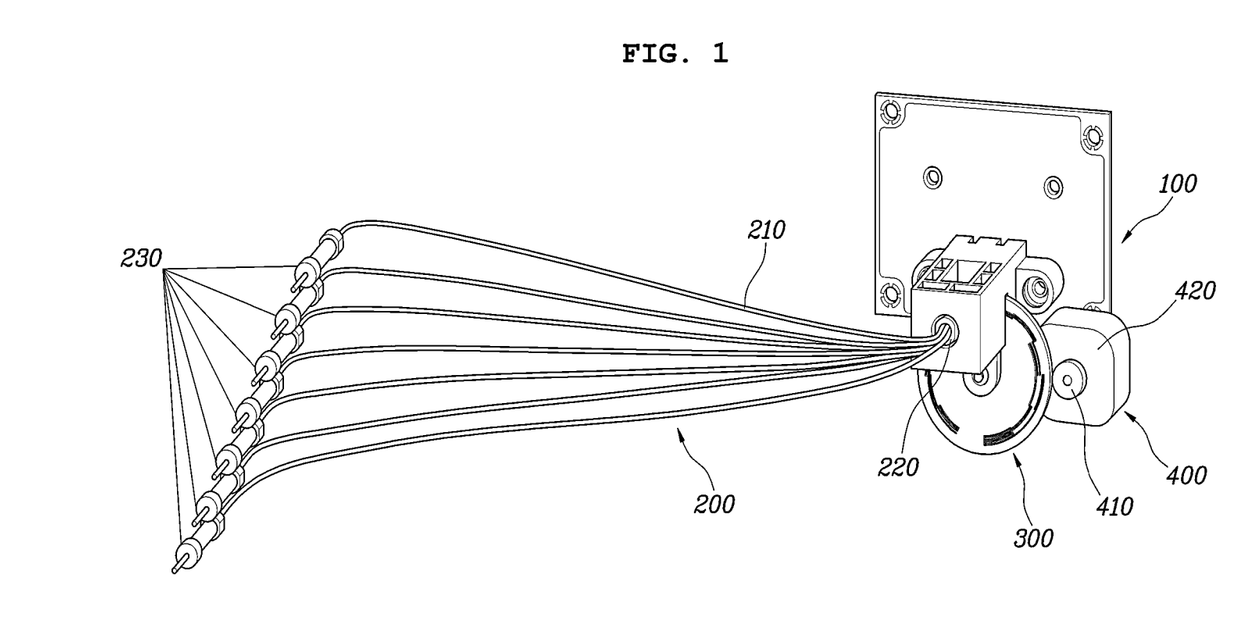
FIG. 1 is a view illustrating a variable lighting apparatus according to an embodiment of the present disclosure.

According to an embodiment of the present disclosure, as illustrated in FIG. 1, the variable lighting apparatus includes a light source module 100 configured to emit light, a light transfer unit 200 including a plurality of optical fibers 210 each having one end disposed to receive the light emitted from the light source module 100, and a light output member 300 positioned between the light source module 100 and one end of each of the optical fibers 210 and divided into a plurality of regions. In particular, the plurality of regions of light output member 300 may include: a first region having a light transmission portion 310 that transmits light, a second region having a light adjustment portion 320 that blocks or converts a movement of light, and a third region having a plurality of light transmission portions 310 and a plurality of light adjustment portions 320. The variable lighting apparatus further includes a drive unit 400 connected to the light output member 300 and configured to selectively change a position of the light output member 300 to allow any one of the regions of the light output member 300 to be matched between the light source module 100 and the optical fiber 210.

In the present disclosure, the light emitted from the light source module 100 passes through the light output member 300 and moves to the optical fibers 210 of the light transfer unit 200, such that a lighting image is formed by the light emitted from the optical fibers 210.

In this case, the light output member 300 has the plurality of regions provided between the light source module 100 and the optical fibers 210 of the light transfer unit 200 and including the light transmission portions 310 and the light adjustment portions 320.

For example, the light output member 300 is divided into the plurality of regions. Some of the plurality of regions include only the light transmission portions 310 and transmit the light without change. Some of the plurality of regions include only the light adjustment portions 320 and block the movement of the light. The remaining regions include both the light transmission portions 310 and the light adjustment portions 320 and transmit only a part of the light. In particular, in the region in which both the light transmission portion 310 and the light adjustment portion 320 are provided, the light output member 300 may implement various patterns by combining the light transmission portion 310 and the light adjustment portion 320. Therefore, the optical fiber 210, to which the light is inputted among the plurality of optical fibers 210, varies depending on the position of the light output member 300, such that the lighting image implemented by the optical fiber 210 may be diversified for each of the regions of the light output member 300.

To this end, the light output member 300 is provided to change in position, and the position of the light output member 300 is changed by the drive unit 400. That is, various lighting images may be implemented as the optical fiber 210, to which the light is inputted, varies depending on the position of the light output member 300 that is changed by the drive unit 400.

Figure 2:
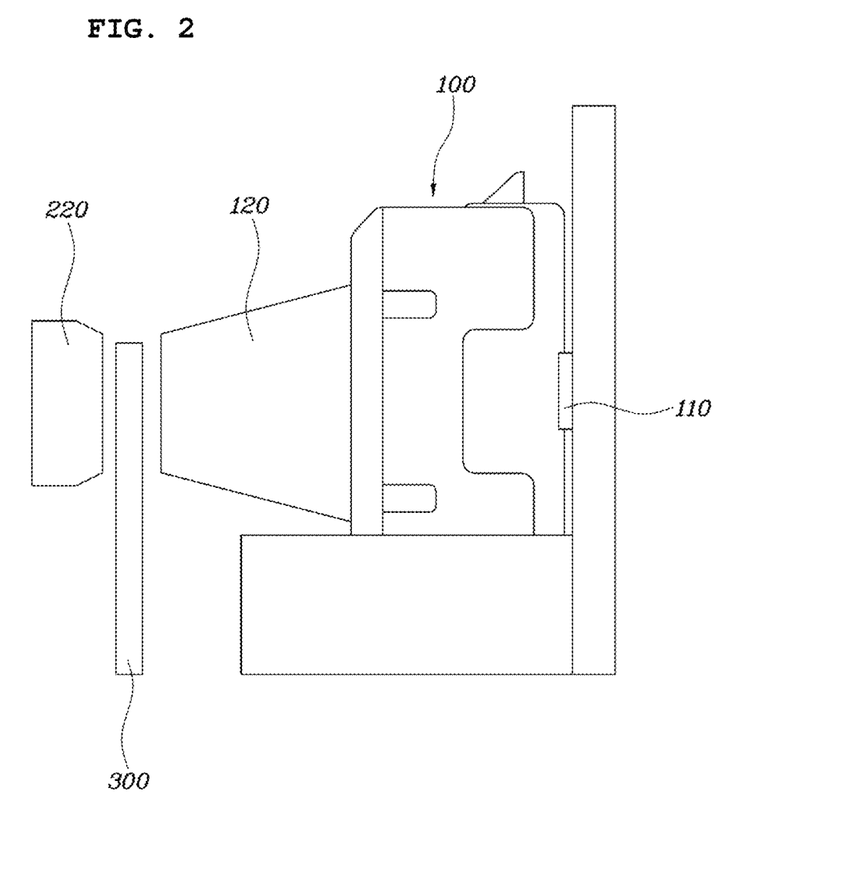
FIG. 2 is a view illustrating a light source module of the variable lighting apparatus illustrated in FIG. 1.

The present disclosure is described specifically. The light source module 100 may include a light source 110 configured to generate light, and a lens part 120 configured to concentrate the light, which is generated by the light source 110, on one end of the optical fiber 210.

As illustrated in FIG. 2, the light source module 100 may include the light source 110 and the lens part 120. The light source 110 may be configured by an LED, and the lens part 120 may be configured to concentrate the light emitted from the light source 110. In this case, the lens part 120 has an aspherical incident portion, such that the light emitted from the light source 110 may be converted into parallel light.

Therefore, as the light emitted from the light source 110 passes through the lens part 120, the light may have straightness and enter the optical fibers 210 of the light transfer unit 200.

Figure 3:
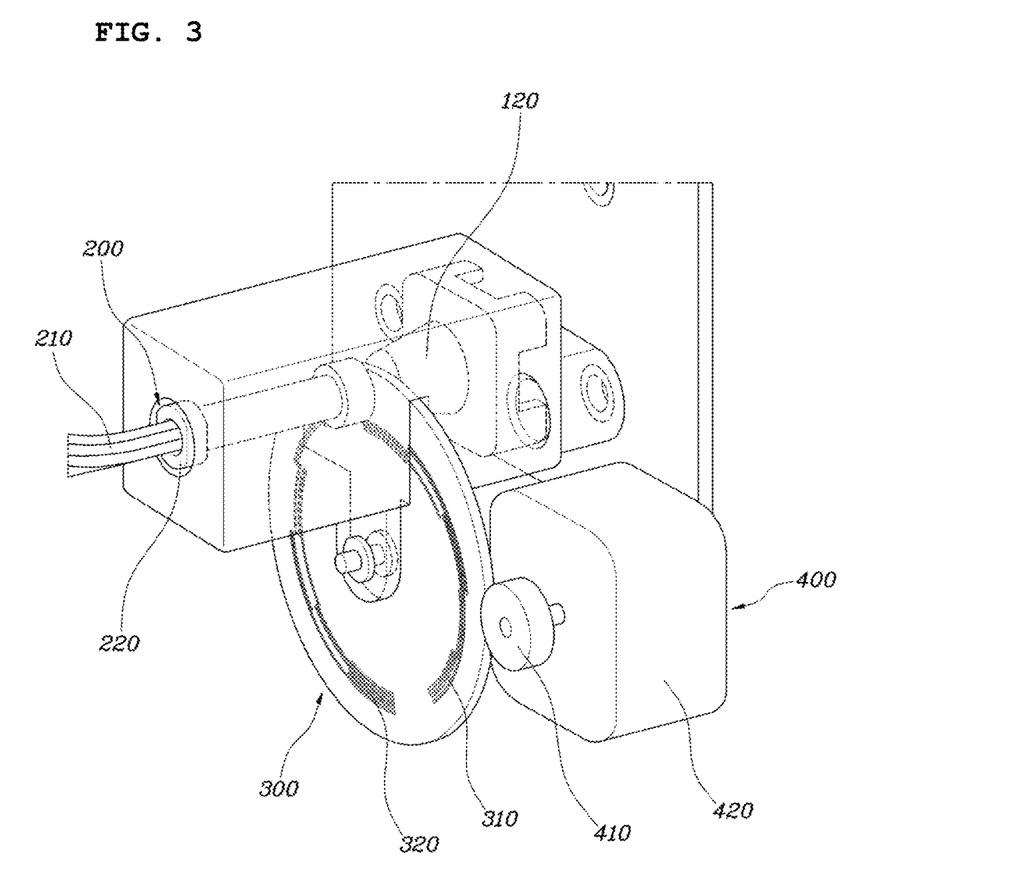
FIG. 3 is a configuration view of the variable lighting apparatus illustrated in FIG. 1.
Figure 6:
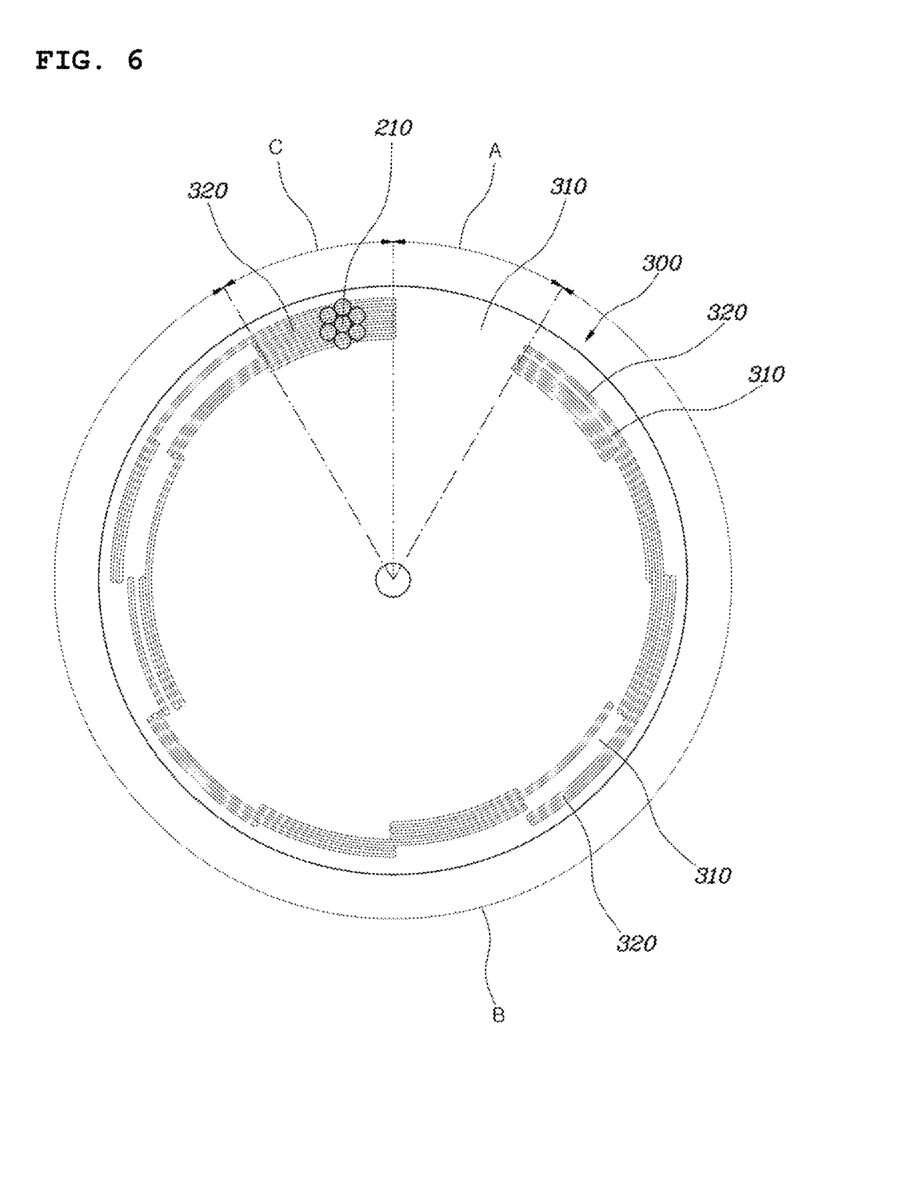
FIG. 6 is a view illustrating the light output member according to an embodiment of the present disclosure.

Meanwhile, the light output member 300 may be formed in a circular plate shape and configured to be rotatable. The plurality of regions may be defined along a rim of the light output member 300.

As illustrated in FIGS. 3 and 6, the light output member 300 is formed in a circular plate shape. The plurality of regions having the light transmission portions 310 and the light adjustment portions 320 is defined along the rim of the light output member 300. In other words, the plurality of regions is defined in a rotation direction based on a rotation center of the light output member 300. The light transmission portions 310 and the light adjustment portions 320 are differently formed in the respective regions.

In addition, the light output member 300 is provided rotatably and connected to the drive unit 400. When the rotation position of the light output member 300 is changed, the lighting image is determined depending on the region matched with the light source 110 and the optical fiber 210.

Figure 4:
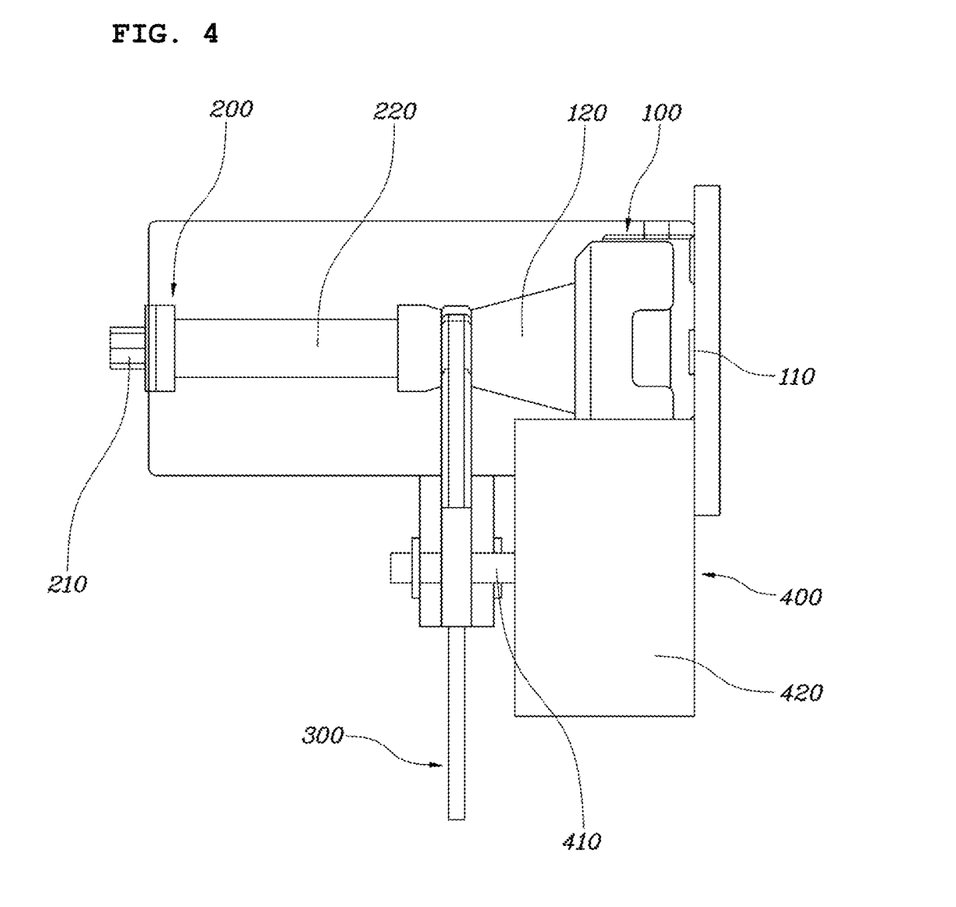
FIG. 4 is a view illustrating a light output member and a drive unit according to an embodiment of the present disclosure.
Figure 5:
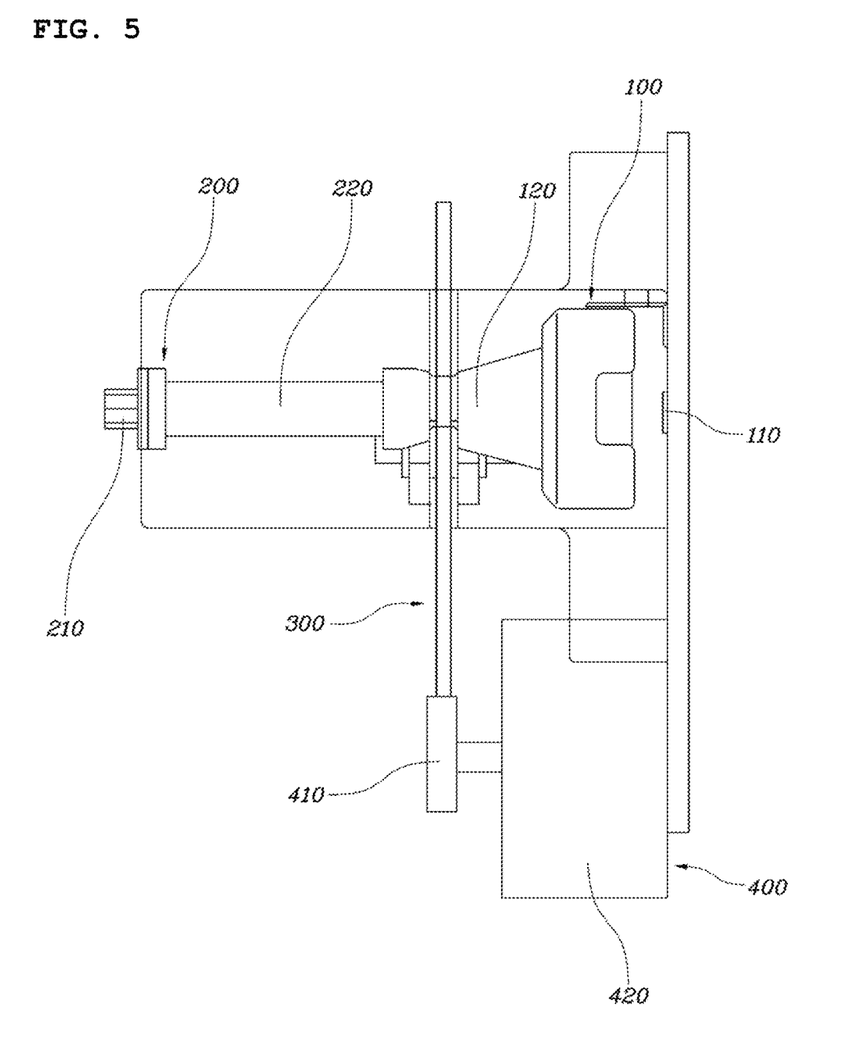
FIG. 5 is a view illustrating a light output member and a drive unit according to another embodiment of the present disclosure.

The drive unit 400 includes a rotary shaft part 410 configured to rotate in accordance with whether the drive unit 400 operates. That is, the drive unit 400 includes the rotary shaft part 410 configured to be rotated by an operation of a motor 420. The rotary shaft part 410 is connected to the light output member 300, such that the position of the light output member 300 may be changed in accordance with the rotation position of the rotary shaft part 410.

As illustrated in FIG. 4, the rotary shaft part 410 may be connected to a rotation center of the light output member 300. Alternatively, as illustrated in FIG. 5, the rotary shaft part 410 may be connected to a peripheral surface of the light output member 300. In this case, a gear connection structure may be applied to connect the rotary shaft part 410 of the drive unit 400 to the peripheral surface of the light output member 300, such that the rotation position of the light output member 300, which is determined by the rotary shaft part 410, may be specified. The drive unit 400 may adopt a solenoid structure instead of the rotary motor 420.

Figure 7:
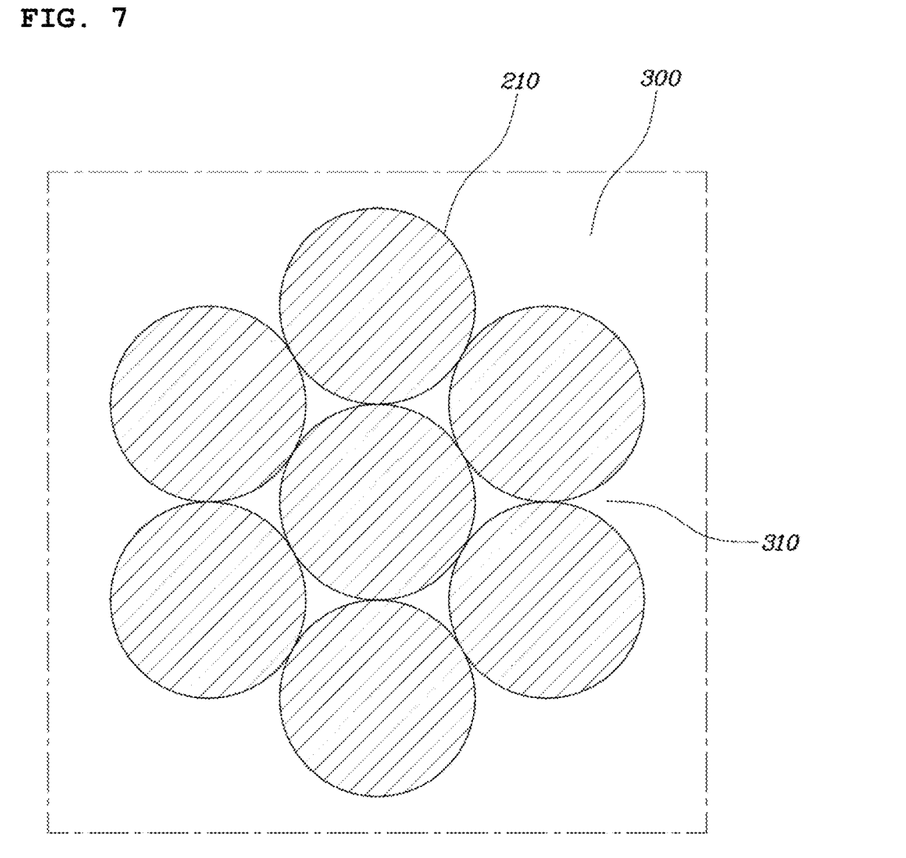
FIG. 7 is a view illustrating an optical fiber matched with a transmission region of the light output member according to an embodiment of the present disclosure.

According to another embodiment of the present disclosure, the light transmission portion 310 and the light adjustment portion 320 may extend along a rotation radius of the light output member 300. The light transmission portions 310 and the light adjustment portions 320 may be disposed in different patterns in a radial direction of the light output member 300 for each of the regions of the light output member 300.

As illustrated in FIGS. 6 to 7, the light transmission portion 310 and the light adjustment portion 320 extend along the rotation radius in each of the regions of the light output member 300, such that it is possible to minimize heterogeneity related to a change in lighting image of the optical fiber 210 when the region, to which the light is inputted, is changed from the current region to another region as the rotation position of the light output member 300 is changed.

In addition, the light transmission portions 310 and the light adjustment portions 320 may extend curvedly in the rotation direction and pass through the plurality of optical fibers 210 obliquely, such that it is possible to minimize portions of the plurality of optical fibers 210 that adjoin the light transmission portion 310 or the light adjustment portion 320 at ordinary times. Further, the light transmission portions 310 and the light adjustment portions 320 are stacked in the radial direction of the light output member 300, which makes it easy to diversify the arrangement of the light transmission portions 310 and the light adjustment portions 320.

The light output member 300 of the present disclosure may include a transmission region A including the light transmission portion 310, a plurality of pattern regions B in which the light transmission portions 310 and the light adjustment portions 320 are differently combined to implement different patterns, and a blocking region C including the light adjustment portions 320.

In other words, the light output member 300 may have the plurality of regions defined in the rotation direction. The regions may be divided into the transmission region A, the pattern region B, and the blocking region C.

As illustrated in FIG. 7, the transmission region A is an area including only the light transmission portion 310 and configured to transmit the light. In case that the light output member 300 is made of a material having high permeability, the transmission region A may be the remaining region, except for the light adjustment portion 320.

Figure 8:
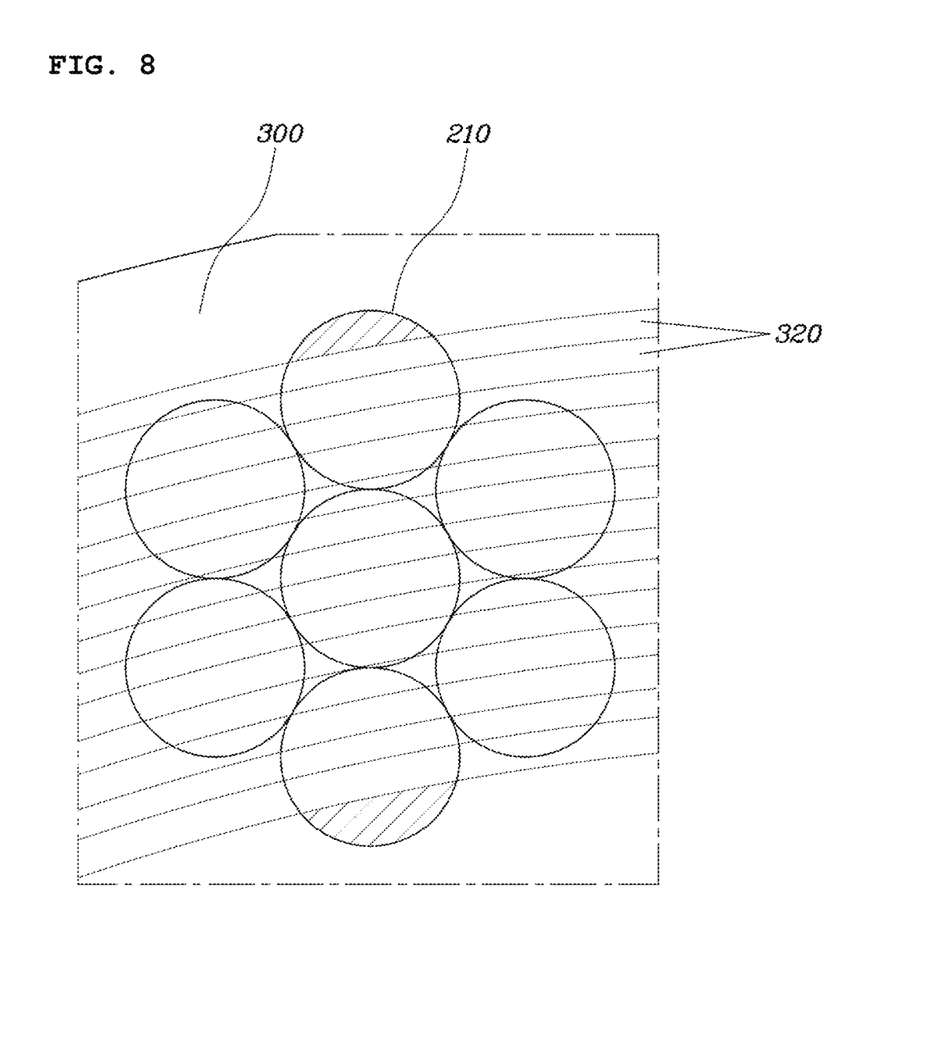
FIG. 8 is a view illustrating an optical fiber matched with a blocking region of the light output member according to an embodiment of the present disclosure.

As illustrated in FIG. 8, the blocking region C may include only the light adjustment portion 320 and be configured to block or convert the movement of the light. In the present disclosure, the blocking region C may be configured to block the movement of the light. In case that the optical fiber 210 is matched with the blocking region C, the output amount of light passing through the light output member 300 may be minimized.

Figure 9:
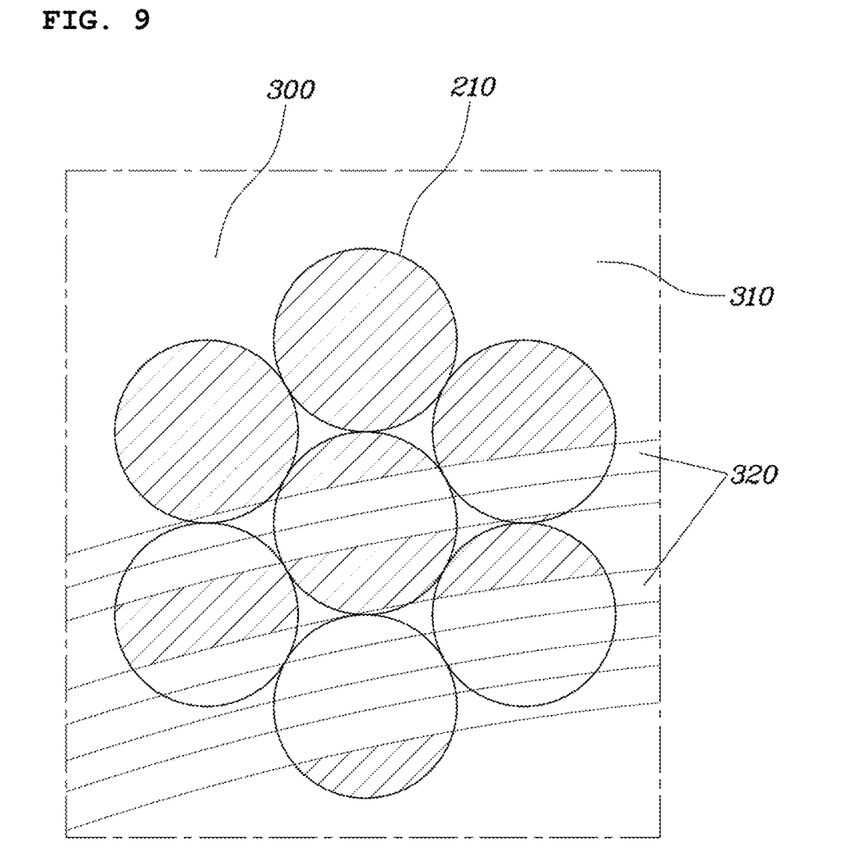
FIG. 9 is a view illustrating an optical fiber matched with a pattern region of the light output member according to an embodiment of the present disclosure.
Figure 10:
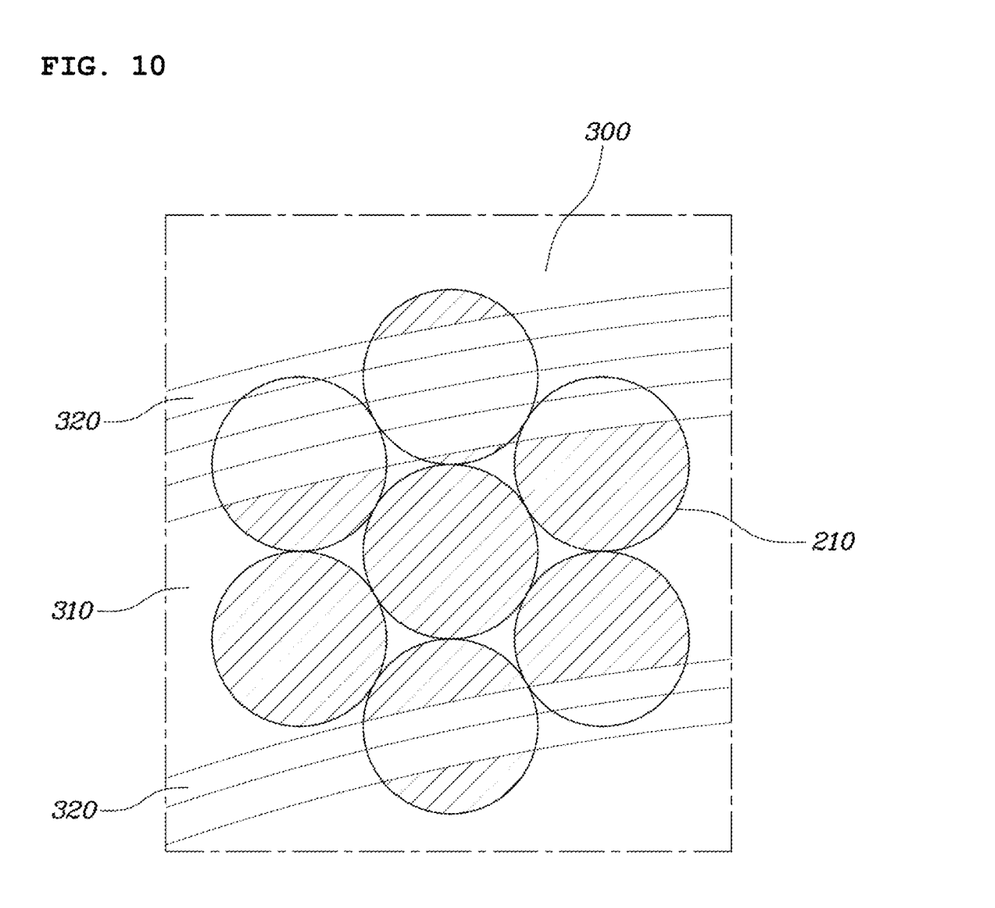
FIG. 10 is a view illustrating the optical fiber matched with the pattern region of the light output member according to an embodiment of the present disclosure.

As illustrated in FIGS. 9 and 10, the pattern region B may be provided as a plurality of pattern regions B. The light transmission portions 310 and the light adjustment portions 320 are differently disposed in the pattern regions B, such that different patterns may be formed for the respective pattern regions B by combining the light transmission portions 310 and the light adjustment portions 320. In particular, various embodiments of the light adjustment portion 320 may be applied to diversify the lighting images in the pattern region B.

Figure 11:
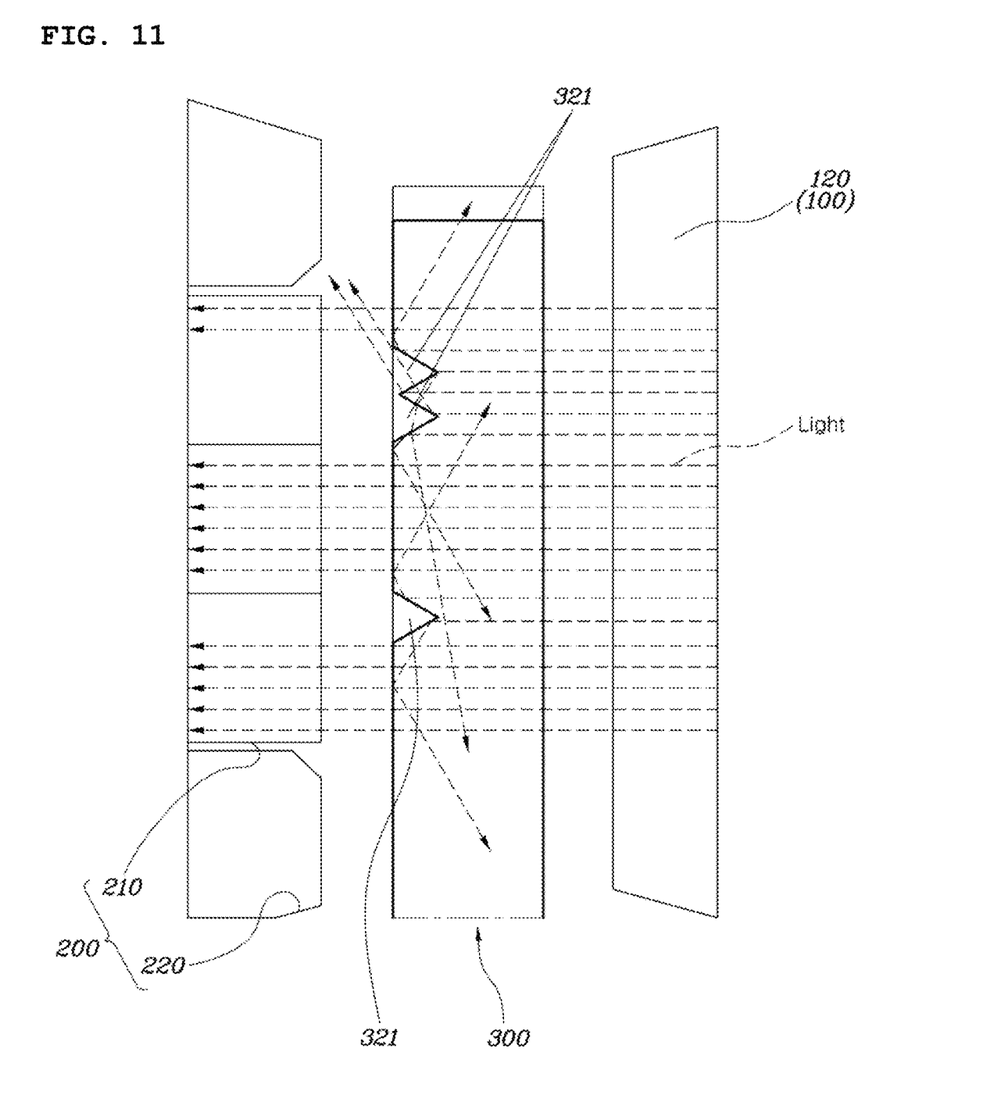
FIG. 11 is a view illustrating an embodiment of a light adjustment portion of the light output member according to an embodiment of the present disclosure.

In one embodiment, as illustrated in FIG. 11, the light adjustment portion 320 may have a plurality of optic portions 321 to scatter the light emitted from the light source module 100.

In other words, the light adjustment portion 320 has the plurality of optic portions 321 formed in a direction in which the light emitted from the light source module 100 is inputted, such that the light is totally reflected, refracted, and scattered when the light comes into contact with the optic portions 321. The optic portion 321 may be variously formed in accordance with a required amount of light transmitted through the light adjustment portion 320. The optic portions 321 of the light adjustment portion 320 may be different in shape and number for each of the regions. For example, the number of optic portions 321 of the light adjustment portion 320 in the pattern region B may be gradually increased or decreased in the rotation direction of the light output member 300, such that as the light output member 300 rotates, the amount of light inputted to the optical fiber 210 may be slowly decreased or increased when the light emitted from the light source 110 is inputted to the pattern region B. Therefore, it is possible to improve an aesthetic appearance.

As another embodiment, the light adjustment portion 320 may be coated with black paint so as not to transmit the light emitted from the light source module 100. As described above, in case that the light adjustment portion 320 is configured to completely block the light, the light inputted to the optical fiber 210 is clearly distinguished by the light adjustment portion 320, in comparison with the light transmission portion 310 that transmits light, such that the lighting image may be formed.

In addition, the plurality of light adjustment portions 320 may be formed to have different colors. As described above, some of or all the light adjustment portions 320 in the pattern region B are formed to have different colors, such that colors of light emitted from the optical fibers may be diversified when the light passes through the light adjustment portions 320 in accordance with the rotation position of the light output member 300. Therefore, the color of the light emitted from the light source module 100 is converted in accordance with the rotation position of the light output member 300, and then the light is inputted to the optical fiber 210, such that the optical fibers 210 may implement the lighting images with various colors.

In another embodiment, in the plurality of pattern regions B, the number of light transmission portions 310 and the number of light adjustment portions 320 are different or the positions of the light transmission portions 310 and the positions of the light adjustment portions 320 are different. Therefore, the lighting images made by the emitted light may be differently implemented for each of the pattern regions B.

In other words, the light is inputted to the optical fiber 210, which is matched with the light transmission portion 310 among the plurality of optical fibers 210, through the light transmission portion 310 and the light adjustment portion 320 in the pattern region B. Because the light transmission portions 310 and the light adjustment portions 320 are formed to be different in number or position for each of the pattern regions B, the position of the light passing through the pattern region B varies, such that the optical fiber 210, to which the light is inputted among the plurality of optical fibers 210, varies.

For example, in case that the number of light transmission portions 310 is larger in a particular pattern region B than that in another pattern region B, the amount of light, which passes through the particular pattern region B and enters the optical fiber 210, may increase. In addition, because the optical fiber 210, to which the light is inputted among the plurality of optical fibers 210, varies depending on the position of the light adjustment portion 320 in the pattern region B, the optical fibers 210, which emit light, may be differently determined for each of the pattern regions B.

Therefore, the optical fiber 210, to which the light is inputted, varies for each of the pattern regions B matched between the light source module 100 and the optical fiber 210 in accordance with the rotation position of the light output member 300. Therefore, the lighting image made by the optical fiber 210 varies for each of the pattern regions B, such that various lighting images may be implemented.

In one embodiment, ends of the plurality of optical fibers 210 may be densely collected by a multi-ferrule 220. A width of the densely collected optical fibers 210 may be larger than a width of the light adjustment portion 320 in each of the regions of the light output member 300.

The multi-ferrule 220 has a shape having a penetrated interior. The ends of the plurality of optical fibers 210 are introduced into the multi-ferrule 220, such that the optical fibers 210 are densely collected. In the embodiment according to the present disclosure, seven strands of optical fibers 210 are provided. However, the number of optical fibers 210 may be variously changed depending on the lighting design or required light amount. In the state in which the plurality of optical fibers 210 is densely collected by the multi-ferrule 220, the plurality of optical fibers 210 may be disposed and fixed so that the light emitted from the light source module 100 enters the plurality of optical fibers 210.

In particular, an overall width of the densely collected optical fibers 210 is larger than a width of the light adjustment portion 320 for each of the regions of the light output member 300, such that the passage and blockage of the light, which moves to each of the optical fibers 210, are clearly distinguished by the light adjustment portion 320 of the light output member 300. In addition, even in the region that maximally restricts the movement of the light emitted from the light output member 300, the light emitted from the light source module 100 may be inputted to some of the optical fibers 210, which may improve the aesthetic appearance by means of the light finely emitted from the optical fibers 210.

In addition, a single ferrule 230 may be provided at the other end of each of the optical fibers 210, such that the optical fibers 210 may be fixed to another component. The single ferrule 230 may be made of a plastic material and configured such that the optical fiber 210 is fixedly inserted into the single ferrule 230. Because the other end of the optical fiber 210 is fixed by the single ferrule 230, it is possible to prevent the optical fiber 210 from being damaged by a fixing process. In addition, because the single ferrule 230 with the ensured rigidity is coupled to another component, the working convenience may be ensured, damage to the optical fiber 210 may be prevented, and the quality of the optical fiber 210 may be maintained.

In one embodiment, some of the light transmission portions 310 or the light adjustment portions 320 in the pattern region B may be connected to the light transmission portion 310 or the light adjustment portion 320 in another adjacent pattern region B.

In the present disclosure, the light transmission portions 310 and the light adjustment portions 320 are differently disposed in the plurality of pattern regions B, such that the optical fiber 210, to which the light is inputted among the plurality of optical fibers 210, varies. In addition, the position of the light output member 300 is changed by the drive unit 400, such that any one of the plurality of pattern regions B is determined.

In this case, some of the light transmission portions 310 or the light adjustment portions 320 in the plurality of pattern regions B are connected to the light transmission portion 310 or the light adjustment portion 320 in another adjacent pattern region B, such that the same light transmission portions 310 or the same light adjustment portions 320 are provided in the adjacent pattern regions B. Therefore, in case that the pattern region B matched with the optical fiber 210 is changed to another pattern region B as the position of the light output member 300 is changed, the light may be inputted to the same optical fiber 210 or blocked at the portion having the same light transmission portion 310 or the same light adjustment portion 320. Therefore, even when the pattern region B is changed by the change in position of the light output member 300, the particular optical fiber 210, among the plurality of optical fibers 210, is kept in a light-emitting state, such that the heterogeneity caused by the change of the pattern region B is eliminated. In addition, the respective optical fibers 210 may sequentially emit light when the pattern region B matched with the optical fiber 210 is changed as the position of the light output member 300 is changed.

As described above, the light output member 300 may be divided into the transmission region A, the plurality of pattern regions B, and the blocking region C, and various embodiments of the light adjustment portions 320 may be applied, such that the respective pattern regions B may implement different lighting images.

As described above, according to the present disclosure, the respective optical fibers 210 of the light transfer unit 200 selectively emit light by using the light output member 300 that is changed in position by the drive unit 400, thereby implementing various lighting designs.

Figure 12:
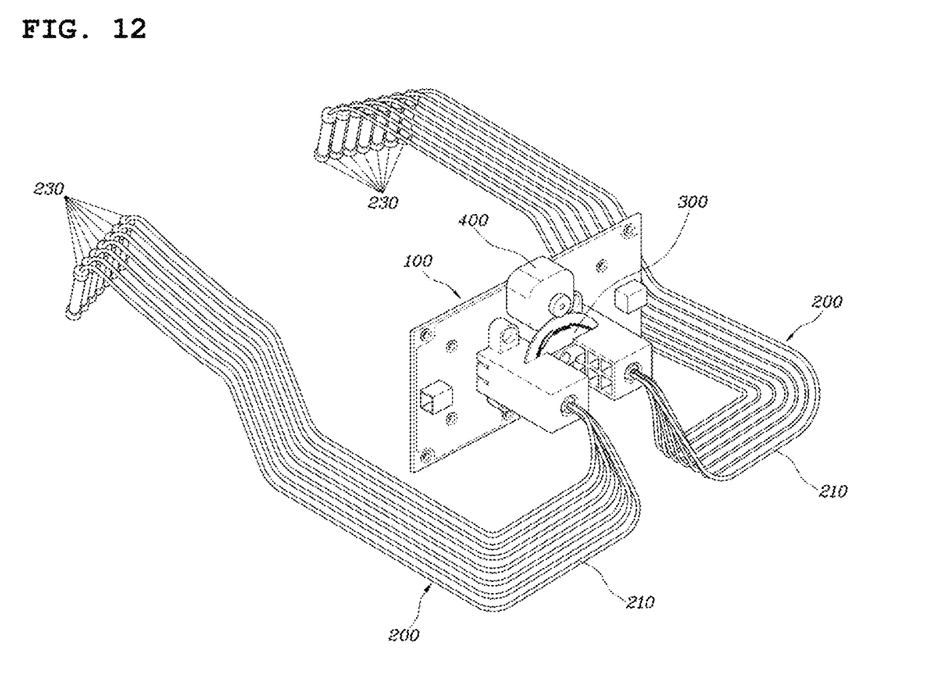
FIG. 12 is a view illustrating a variable lighting apparatus according to another embodiment of the present disclosure.

In addition, as illustrated in FIG. 12, the plurality of light source modules 100 and the plurality of light transfer units 200 are provided, and the plurality of light source modules 100 and the plurality of light transfer units 200 are configured to be matched with the single light output member 300. Therefore, the optical fibers 210 may be additionally ensured, and the optical fibers 210, as design elements, may be disposed at various positions.

As described above, the present disclosure may be applied to various positions of mobility vehicles, such as interior lamps or headlamps. The plurality of optical fibers 210 may selectively emit light in accordance with the position of the light output member 300 and implement dynamic lighting images, thereby improving the high-grade quality of the lighting function and the marketability.

While the specific embodiments of the present disclosure have been illustrated and described, it should be obvious to those of having ordinary skill in the art that the present disclosure may be variously modified and changed without departing from the technical spirit of the present disclosure.

What is claimed is:

1. A variable lighting apparatus comprising:
   a light source module configured to emit light;
   a light transfer unit including a plurality of optical fibers each having one end disposed to receive the light emitted from the light source module;
   a light output member positioned between the light source module and one end of each of the optical fibers, wherein the light output member is divided into a plurality of regions, and at least one of a light transmission portion or a light adjustment portion is provided in each region of the plurality of regions, the light transmission portion configured to transmit light, and the light adjustment portion configured to block and convert a movement of light; and
   a drive unit connected to the light output member and configured to selectively change a position of the light output member to allow one region of the plurality of regions of the light output member to be matched between the light source module and the plurality of optical fibers,
   wherein a single ferrule is provided at another end of each optical fiber of the plurality of optical fibers, such that the plurality of optical fibers is fixed to another component.

2. The variable lighting apparatus of claim 1, wherein the light source module comprises:
   a light source configured to generate light; and
   a lens part configured to concentrate the light, which is generated by the light source, on one end of an optical fiber of the plurality of optical fibers.

3. The variable lighting apparatus of claim 1, wherein the light output member is formed in a circular plate shape and configured to be rotatable, and each region of the plurality of regions extends lengthwise along a circumferential direction of the light output member.

4. The variable lighting apparatus of claim 3, wherein the drive unit includes a rotary shaft part configured to rotate in accordance with whether the drive unit operates, and the rotary shaft part is connected to a rotation center or a peripheral surface of the light output member.

5. The variable lighting apparatus of claim 1, wherein the light transmission portion and the light adjustment portion extend along a circumferential direction of the light output member, and a plurality of light transmission portions and a plurality of light adjustment portions are disposed in different patterns in a radial direction of the light output member.

6. The variable lighting apparatus of claim 5, wherein the plurality of regions of light output member comprises:
   a transmission region including the light transmission portion;
   a plurality of pattern regions in which the light transmission portions and the light adjustment portions are differently combined to implement different patterns; and
   a blocking region including the light adjustment portion.

7. The variable lighting apparatus of claim 6, wherein in the plurality of pattern regions, a number of light transmission portions and a number of light adjustment portions are different or positions of the light transmission portions and positions of the light adjustment portions are different, such that lighting images made by the emitted light are differently implemented for each pattern region of the plurality of pattern regions.

8. The variable lighting apparatus of claim 6, wherein ends of the plurality of optical fibers are densely collected by a multi-ferrule, and a width of the densely collected optical fibers is larger than a width of the light adjustment portion in each region of the plurality of regions of the light output member.

9. The variable lighting apparatus of claim 6, wherein some of the light transmission portions or the light adjustment portions in the plurality of pattern region are connected to the light transmission portion or the light adjustment portion in another pattern region.

10. The variable lighting apparatus of claim 1, wherein the light adjustment portion has a plurality of optic portions to scatter the light emitted from the light source module.

11. The variable lighting apparatus of claim 1, wherein the light adjustment portion is coated with black paint so as not to transmit the light emitted from the light source module.

12. A variable lighting apparatus comprising:
a light source module configured to emit light;
a light transfer unit including a plurality of optical fibers each having one end disposed to receive the light emitted from the light source module;
a light output member positioned between the light source module and one end of each of the optical fibers, wherein the light output member is divided into a plurality of regions, the plurality of regions includes: a first region having at least one light transmission portion configured to transmit light, a second region having at least one light adjustment portion configured to block and convert a movement of light, and a third region having a plurality of light transmission portions and a plurality of light adjustment portions; and
a drive unit connected to the light output member and configured to selectively change a position of the light output member to allow at least one region of the plurality of regions of the light output member to be matched between the light source module and the plurality of optical fibers,
wherein a single ferrule is provided at another end of each optical fiber of the plurality of optical fibers, such that the plurality of optical fibers is fixed to another component.

13. The variable lighting apparatus of claim 12, wherein the plurality of light adjustment portions is formed to have different colors.

* * * * *